United States Patent [19]

Urruti

[11] Patent Number: 4,923,915

[45] Date of Patent: May 8, 1990

[54] THERMALLY STABILIZED RESIN COATINGS FOR OPTICAL FIBERS

[75] Inventor: Eric H. Urruti, Corning, N.Y.

[73] Assignee: Corning Incorporated, Corning, N.Y.

[21] Appl. No.: 195,651

[22] Filed: May 18, 1988

[51] Int. Cl.$^5$ ............................................... C08K 5/34
[52] U.S. Cl. .................................... 524/102; 524/284; 524/291; 522/97
[58] Field of Search .................. 524/102, 284, 291; 522/97

[56] References Cited

U.S. PATENT DOCUMENTS

| | | | |
|---|---|---|---|
| 4,052,351 | 10/1977 | Dix et al. | 524/291 |
| 4,555,535 | 11/1985 | Bednarek et al. | 524/102 |
| 4,608,409 | 8/1986 | Coady et al. | 522/97 |
| 4,609,718 | 9/1986 | Bishop et al. | 522/97 |

Primary Examiner—John Kight, III
Assistant Examiner—Kriellion Morgan
Attorney, Agent, or Firm—Kees van der Sterre

[57] ABSTRACT

UV-curable urethane-acrylate resin systems of improved thermal stability in the cured state are provided, the resins being of polyurethane acrylate, polyurea acrylate, and/or polyurethane/polyurea acrylate composition and being thermally stabilized by the addition of a combination of stabilizers which includes a hindered piperidine derivative and a hindered phenol derivative. The stabilized resin systems, useful for example for the protective coating of glass optical fibers, retain their rapid UV curing characteristics.

17 Claims, 2 Drawing Sheets ized resin coatings for optical fibers has not been

THERMALLY STABILIZED RESIN COATINGS FOR OPTICAL FIBERS

BACKGROUND OF THE INVENTION

The present invention relates generally to coating compositions suitable for coating glass and glass products. More particularly, the invention relates to radiation-curable acrylate coating compositions for glass optical fibers.

A relatively recent innovation in the field of telecommunications is the development of glass optical fibers. These fibers, when properly protected by suitable coatings and cabling, have the capability of carrying large amounts of information over long distances with very low signal attenuation.

As is well known, however, protective coatings must be applied to these glass telecommunications fibers at the time of manufacture, both to preserve the inherent strength of the fibers and to protect them from certain types of bending which can induce signal loss in telecommunication cables. More specifically, the coatings applied to the fibers must enable them to resist short radius bending (so-called microbending) which can arise when the coated or cabled fiber is subjected to physical stress and/or changes in temperature in use.

In combination, these requirements dictate that the coating applied to the optical fiber have both substantial toughness and yet be soft enough to distribute transverse strain applied to the fiber. A wide variety of organic coating materials designed to meet these needs have been proposed for use as optical fiber coatings, including but not being limited to silicone polymers, silicone oils, lacquers, and urethane and/or acrylate polymers.

An additional requirement for optical fiber coating materials derives from the fact that very high optical fiber drawing speeds are now being employed in the industry for reasons of manufacturing efficiency. For economic production, therefore, a glass coating material is needed which can be rapidly applied to and cured on the surface of the optical fiber. Currently, the preferred coating materials for rapid optic fiber production are radiation-curable coating formulations which can be very rapidly cured without the need for solvent volatilization or heating, simply by exposing the fibers coated with the uncured resin coating material to intense radiation.

Among the radiation-curable coating formulations presently used for the application of protective coatings to glass optical fibers are radiation curable acrylate materials. These are typically ultraviolet-curable oligomers or polymers, available in liquid form, which exhibit good softness over a very broad temperature range, good tensile strength and toughness, and rapid UV curing characteristics.

Preferred examples of these UV-curable acrylate compositions are reported in published European patent applications EP 0204160 and EP 0204161. The compositions therein described, loosely termed UV-curable polyurethane acrylates in the art, are based on resins more specifically designated in these applications as acrylate-terminated polyurethane, polyurea, or polyurethane/polyurea oligomers.

It is of course important that the resin formulations selected for application to these optical fibers maintain properties over an extended period of time. Thus the coatings should not exhibit significant changes in properties, and especially in their elastic properties, with prolonged exposure to ambient temperature variations and other environmental conditions. Many of the older optical fiber coating materials exhibited substantial variations in properties when exposed to environmental changes, these variations being attributable to the chemical structure, purity, and/or the degree of cure of the coatings. To counteract these effects, it has been conventional to employ various additives such as antioxidants, UV-stabilizers, and antihydrolysis agents which help to stabilize the cured coatings against changes in composition and structure.

The type of additive employed of course depends upon the coating system being modified. Thus it is not readily predictable whether an additive having demonstrated effectiveness in one resin system will exhibit helpful or harmful effects when employed in a different resin system. In the case of polyurethane acrylates such as presently utilized for optical fibers, additives such as hindered piperidine derivatives have been used in the past. See, for example, "Weathering of UV Cured Coatings," L. R. Gatechair, *UV Curing: Science and Technology*, S. P. Pappas, Ed., Vol. 2, Chapter 7 (1985). However, other additives have not been used because of concerns about their effects on the cured and uncured resins. For example, it is known that antioxidant additives can interfere with the free radical curing process relied upon for the rapid curing of these resins.

When adding stabilizing constituents to UV-curable resin formulations for use as optical fiber coatings, several key properties of the resins must remain substantially unaffected. The additives must not reduce the curing speed of the resin used to apply the coating, must not undesirably affect the shelf life of the uncured resin formulation, and must not affect the short or long term elastic properties of the cured coating.

Presently available resins of the kind described in the aforementioned published European patent applications, some of which are currently used to provide high-elasticity, low-modulus, primary protective coatings on optical fibers, generally exhibit all of the required properties of rapid cure, low elastic modulus, and high toughness. However, it has recently been determined that at least some of these formulations do not exhibit the requisite thermal stability. Thus sample materials of these types have recently been evaluated which exhibit readily observable deterioration on brief exposure to elevated temperatures.

While the precise mechanism giving rise to the thermal instability observed in these coatings has no been identified, it has been observed that significant weight loss in the radiation-cured resins can be observed at heating temperatures as low as 85° C., with substantial losses occurring after even a relatively brief exposure to temperatures as low as 130° C. Moreover there is reason to believe that thermal degradation also occurs, although more slowly, at even lower temperatures such as may be encountered by optical fibers in actual use. This is deemed unacceptable since gas or liquid by-products of the degradation reaction could potentially cause fiber attenuation problems, as the result of unpredictable stress generation by these by-products when trapped in optical cables.

It is a principal object of the present invention to provide a solution to the problem of cured coating thermal instability in polyurethane and/or polyurea acrylate coatings of the presently used type above described.

It is a further object of the invention to provide stabilized polyurethane or polyurea coatings which, after curing, do not exhibit the rapid thermal degradation of the known coatings of this type.

Other objects and advantages of the invention will become apparent from the following description thereof.

SUMMARY OF THE INVENTION

One suspected mode of deterioration which could account for the instability of polyurethane and polyurea acrylate resins of the known type above described is oxidative depolymerization. Hence, interaction of the cured resin coatings with oxygen at elevated temperatures could cause the formation and volatilization from the cured resin of monomeric species or volatile organic compounds.

Investigations designed to test this hypothesis, however, have indicated that the postulated depolymerization reactions, if indeed they occur, can occur in the absence of oxygen and in fact will proceed rapidly in an inert atmosphere such as argon. Hence differential scanning calorimetry tests indicate an exothermic reaction at 90°–100° C. in argon for at least one commercial coating of the described type. This suggests that an important thermally induced mode of degradation for these coatings does not depend on the presence of large amounts of excess oxygen.

In accordance with the invention, a combination of additives has been identified which exhibits a high degree of effectiveness in stabilizing the cured resins against heat-induced depolymerization and/or other degradation reactions without unacceptable side effects. That combination is a combination comprising a hindered piperidine derivative and a hindered phenol derivative.

Hindered derivatives of this type have previously been used as antioxidants in polybutadiene systems. Thus M. G. Chan et al., in "The Stabilization of UV Curable Coatings for Optical Fibers," 4th International Conference on Plastics in Telecommunications, The Plastics and Rubber Institute, 14/1–14/9 (1986) disclose that these derivatives have shown beneficial effects in oxidative environments to retard polybutadiene resin oxidation.

Surprisingly, the identified combination of phenol and piperidine derivatives has now been found to be highly effective in reducing heat-induced depolymerization and/or other degradation reactions in the polyurethane acrylate systems of current commercial interest without unduly retarding the cure rate of these systems. This effectiveness is demonstrated over a relatively broad range of temperatures and at relatively low derivative concentrations. Further, thermogravimetric analyses (TGA) of compositions comprising these stabilizers show clear evidence that the reactions leading to coating weight loss can be significantly retarded in inert gas as well as under oxidizing conditions. Hence it is expected that thermally induced weight losses can be effectively eliminated with this combination of stabilizers at anticipated use temperatures in the cabled optical fiber environment.

The present invention therefore includes a method for stabilizing UV-curable polyurethane acrylate, polyurea acrylate, and polyurethane/polyurea acrylate resins against post-curing thermal decomposition, that method comprising the step of adding to the resins the above-described combination of stabilizers. The stabilizer combination will consist essentially of both a hindered piperidine derivative and a hindered phenol derivative, the combination being added in a concentration at least effective to reduce the thermal decomposition rate, i.e., the rate of thermally induced weight loss, exhibited by the cured resin.

The invention further comprises an improvement in a composition for a UV-curable polyurethane acrylate, polyurea acrylate, or polyurethane/polyurea resin of the known type, that improvement comprising the addition to the resin of a combination of stabilizers which comprises a hindered piperidine derivative and a hindered phenol derivative. The stabilizers are added in concentrations which, in combination, are at least effective to reduce the thermal decomposition rate of the cured resin.

UV-curable urethane-acrylate coating compositions suitable for stabilization in accordance with the invention include the known compositions described in European patent applications EP 0204160 and EP 0204161, these compositions comprising polyacrylate-terminated or acrylate-terminated linear polyurethane, polyurea, or polyurethane/polyurea oligomers as the principal components. By polyurethane/polyurea oligomers or resins is meant, for the purpose of the present description, a resin or oligomer comprising both urethane and urea groups in the molecule, such materials and the synthesis thereof being fully described in the referenced patent applications. By principal components is meant that one or a combination of these oligomers makes up at least about 50% by weight of the coating composition.

It has been demonstrated that compositions of this type can be modified with the described additives without incurring unacceptable increases in curing time, and without undesirably altering the elastic properties of the cured coatings. Further, the shelf life of uncured resins of this type which comprise the stabilizer combination, and the cosmetic properties of the coatings provided therefrom, remain substantially unaffected.

DESCRIPTION OF THE DRAWINGS

The invention may be further understood by reference to the drawings wherein.

DETAILED DESCRIPTION

A number of tests have been employed in the prior art for the purpose of evaluating the stability of plastic resins over time. In the present work, however, thermal aging has been found to be the most effective method for evaluating the characteristics of cured urethane-acrylate coatings which exhibit the depolymerization behavior above described.

Thermal testing of these resins may be carried out in two distinctly different ways. The first approach involves determining weight loss as a function of temperature while heating a cured resin sample. The second approach is to heat the sample for a prolonged period at some fixed elevated temperature, continuously determining sample weight loss as a function of time.

Heating resin samples at constant temperatures for prolonged periods is considered more representative of actual aging conditions in cabled fibers, but aging at the projected upper use temperatures of cabled fibers, which temperatures are typically below 100° C., is not practical because of the very low rates of heat degradation at these temperatures. Therefore accelerated aging at temperatures somewhat above the projected upper use temperatures of the coating is used to develop information from which projections of the stability of the coatings at use temperatures can be made. Accelerated aging also aids in understanding the mechanisms by which deterioration occurs in these coating materials.

Figure 1:
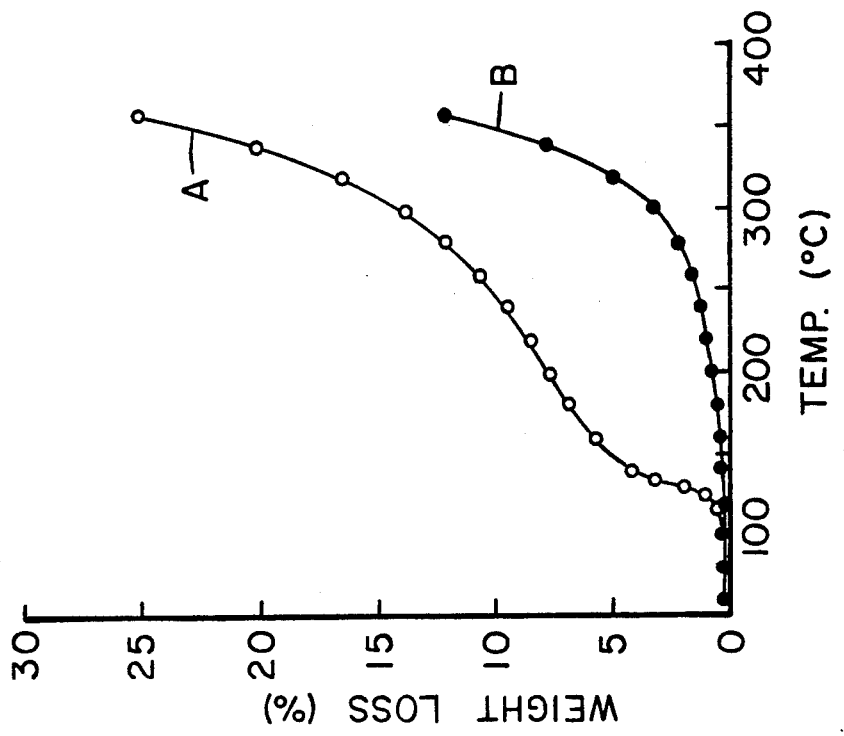
FIG. 1 is a graph reporting weight losses for stabilized and unstabilized samples of cured polyurethane acrylate coating resins as a function of temperature.

As previously noted, it has been established that the reactions causing rapid weight loss in the known UV-curable urethane acrylates occur even under inert atmospheres such as argon, i.e., in the total absence of free oxygen. Referring to FIG. 1 of the drawing, this effect is demonstrated by Curve A which plots the weight loss of an unstabilized cured sample of a polyurethane acrylate resin as the sample is heated in a flowing argon atmosphere over the temperature range 50°–350°0 C. As is evident from a study of FIG. 1, the unstabilized resin exhibits rapid weight loss commencing at about 130° C., with weight loss exceeding 20% at 300° C.

Curve B in FIG. 1 of the drawing demonstrates the behavior of a stabilized cured polyurethane acrylate coating provided in accordance with the invention on similar heating. In contrast to the behavior of the unstabilized coating, the stabilized urethane-acrylate resin plotted in FIG. 1 exhibits very little weight loss at temperatures below 300° C. in argon.

The significant difference between Curves A and B shows the unexpected effectiveness of the selected stabilizer combination in retarding the undesired depolymerization reactions observed on heating these coatings. Such behavior is particularly important in view of the fact that the optical cable environment, like that of the test environment, generally contains little or no free oxygen.

Figure 2:
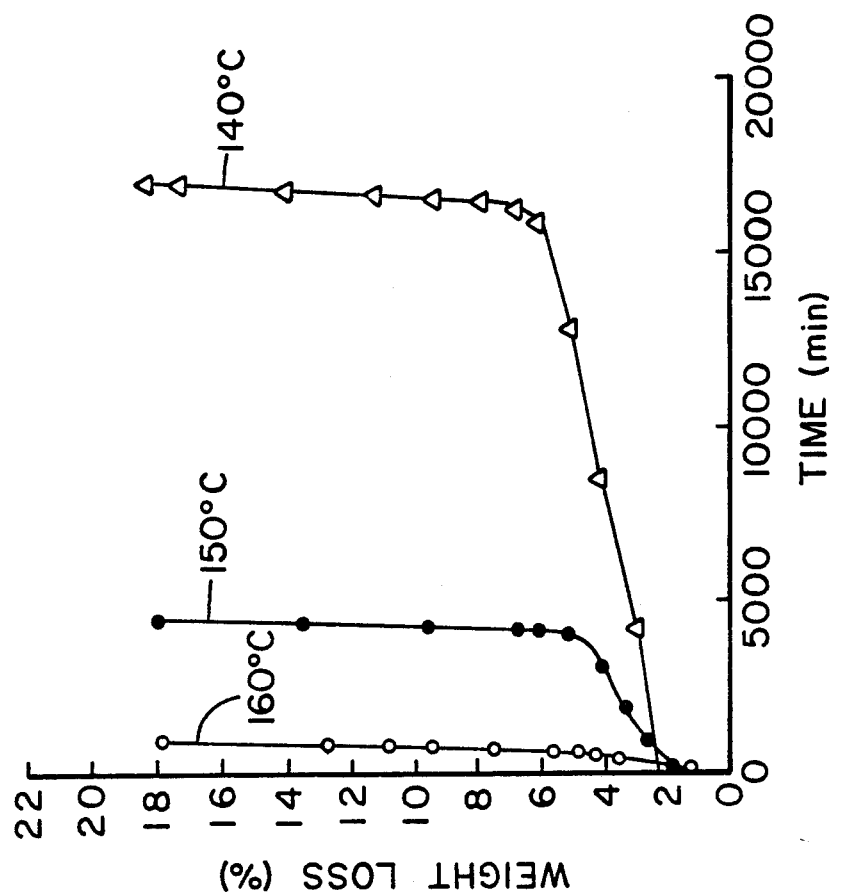
FIG. 2 is a graph plotting long term weight loss at selected elevated temperatures for a stabilized cured polyurethane acrylate coating resin provided in accordance with the invention.

FIG. 2 of the drawing shows the results of thermogravimetric analyses (TGA) of a stabilized cured polyurethane acrylate coating material provided in accordance with the invention. The data shown are curves plotting sample weight over time, and were generated by TGA tests conducted on small samples of cured resin, wherein each of the samples was heated in air at a selected elevated decomposition temperature for a prolonged period. The elevated temperature for each test is indicated adjacent the curve corresponding thereto.

Characteristic features of TGA curves exhibited by these stabilized resin coatings and shown in FIG. 2 are a small but rapid weight loss (approximately 2%) on initial heating, due to the volatilization of low molecular weight unreacted materials such as monomers, photoinitiators, or water. This initial weight loss is followed by a more gradual weight loss over a relatively long time interval, the duration of which depends on both resin composition and the heating temperature. Thereafter, and even at the lower test temperatures, the samples exhibit a very rapid weight loss, quickly exceeding 10% of sample weight, which is clearly indicative of a substantial deterioration of the cured polymer.

The relatively long interval of gradual weight loss shown in FIG. 2 and occurring between the initial and final rapid weight losses of the samples is referred to as the induction time for the material. At any given heating temperature, this time interval is found to depend on the presence or absence of certain stabilizers, and on the composition and concentration of any such stabilizers present. Although the stabilized composition analyzed in FIG. 2 demonstrates near-zero induction times at 180° C. and above, the induction time at 140° C. approaches 280 hours. In contrast, the induction time for an unstabilized resin such as reported in FIG. 1 of the application is only on the order of about an hour at 140° C. As is evident from these figures, composition modifications which increase the induction time for the resin at a given temperature effectively decrease the overall rate of thermal decomposition exhibited by the cured resin at that temperature.

Figure 3:
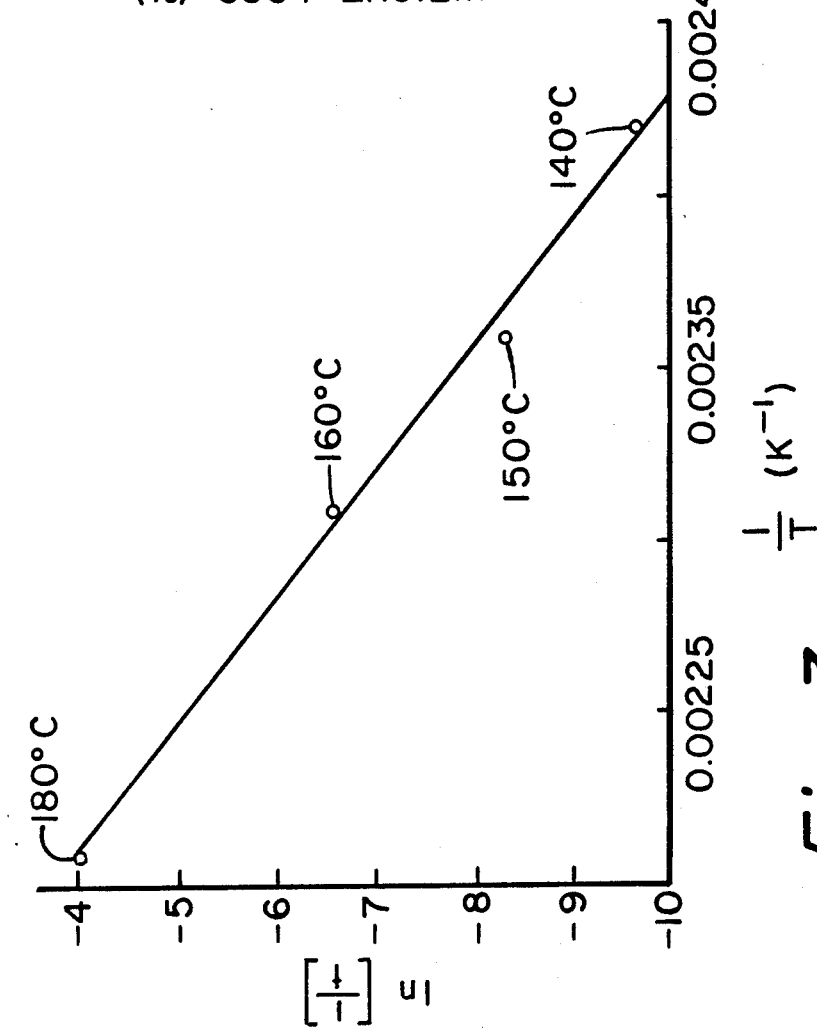
FIG. 3 is a graph plotting delay time to the onset of rapid thermal decomposition at several selected heating temperatures for a stabilized cured polyurethane acrylate coating resin provided in accordance with the invention.

From data such as reported in FIG. 2 it is possible to determine the reaction or decomposition rate of a particular composition as a function of temperature, and from that function to predict the induction time for the composition at some selected lower temperature, e.g. the projected maximum use temperature for the material. FIG. 3 of the drawing is an Arrhenius plot of induction time versus temperature for a stabilized polyurethane-acrylate resin provided in accordance with the invention. In the Figure, the vertical axis indicates the induction time (t) in units of ln [1/t], while the horizontal axis indicates the test temperature (T) in units [1/T] or T in degrees Kelvin. The plot includes data at four heating temperatures, those temperatures actually lying in the range of 140°–180° C. and being shown in the field of the graph. The measured induction times ranged from approximately 1 hour at 180° C. to approximately 280 hours at 140° C.

Extrapolation of the plot of FIG. 3 to the projected maximum continuous use temperature of 85° C. for this particular coating suggests an induction time on the order of 100 years. While this result must be viewed cautiously in view of the fact that a synergistic combination of stabilizers is being used, it is apparent that a substantial safety margin against thermal decomposition of the coating has been provided.

As previously noted, an important concern associated with the use of additives to these UV-curable coating systems is that of cure speed inhibition due to the presence of the stabilizers. Additives of the antioxidant type have the potential for interfering with the free radical oxidation process involved in the curing of these resins. Nevertheless, while some slight increases in curing time are noted in the stabilized coatings provided in accordance with the invention, the increases are not of sufficient magnitude (below 15%) to be of concern. Further, the key properties of the cured resins, including the glass transition temperatures thereof, remain substantially unaffected.

Finally, an evaluation of the optical and other properties of the stabilized resins important in optical fiber coating applications indicate no major problems arising from the use of the disclosed stabilizers. No detectable difference in optical performance is seen between optical fibers coated with stabilized formulations and those coated with formulations comprising no stabilizing additives.

A slight increase in coating adherence to the glass fiber surface is observed in the stabilized coatings, with a slight increase in water absorption also being noted. However neither effect is of sufficient magnitude to significantly affect the utility of the coatings for optical fiber use, and in fact the stabilized formulations exhibited better resistance to cosmetic changes such as color and transparency variations during subsequent storage under ambient conditions.

Among the polyurethane acrylate coating compositions which can be stabilized in accordance with the invention are compositions wherein the major component, comprising 50% or more by weight of the composition, is a linear acrylate-terminated polyurethane, polyurea, or polyurethane/polyurea oligomer. These may be oligomers wherein the acrylate terminal groups are provided by a monohydric polyacrylate capping component, or by more conventional acrylate capping component such as 2-hydroxyethyl acrylate.

As is known, the polyurethane/polyurea oligomers are conventionally provided by reacting an aliphatic diisocyanate with a dihydric or diamino polyether or polyester, preferably a polyoxyalkalene glycol such as a polyethylene glycol. The oligomer typically comprises 4–10 urethane or urea groups, and may be of high molecular weight, e.g., 2000–8000. However, lower molecular weight oligomers, having molecular weights in the 500–2000 range, may also be used.

The coating composition will typically also comprise, in addition to the oligomer component, a lower molecular weight liquid acrylate-functional component and, optionally, a reactive diluent. The liquid acrylate-functional component is added to the acrylate-terminated polyurethane, polyurea, or polyurethane/polyurea oligomer component in order to provide the liquidity needed to apply the coating composition with liquid coating equipment. The reactive diluent is typically an acrylate monomer and, if present, is added to increase the curing speed of the composition.

Suitable acrylate-functional liquids are monoacrylate monomers and linear aliphatic diacrylates. The latter compounds may be low molecular weight polyalkylene (e.g., polypropylene or polyethylene) glycol diacrylates, a specific example of such a compound being tripropylene glycol diacrylate. The reactive polyacrylate diluent may be a triacrylate monomer, an example of such a compound being glyceryl propoxy triacrylate.

Many other polyurethane/polyurea acrylate coating compositions are described in published European patent applications Nos. EP 0204160 and EP 0204161, and those applications are expressly incorporated herein by reference for a further description of alternative acrylate compositions. As noted in these applications, the polyacrylate-terminated polyurethane, polyurea, or polyurethane/polyurea oligomers used in these formulations to impart the necessary low temperature softness are oligomers which have molecular weights in the range of about 2000 to about 8000.

These oligomers typically comprise from 4 to 10 urethane groups per molecule, with the urethane groups being wholly or partially replaceable by urea groups if needed to provide better cured resin strength. The urea groups, if present, may include from about 2 to about 6 urea groups per molecule.

The end-capping components or moieties used as terminal groups on these oligomer molecules are preferably monohydric polyacrylates, an example of such an acrylate being pentaerythritol triacrylate. These capping polyacrylates are bonded to the oligomers by means of diisocyanate linking molecules interposed between each of the terminating polyacrylate capping moieties and the opposing ends of the oligomer chains. This diisocyanate linking is conventional for UV-curable polyurethane acrylate formulations of the known type. The diisocyanates may be of relatively low molecular weight, or they can preferably be selected from among the longer chain diisocyanates such as 1,12-dodecyl diisocyanate.

Diisocyanate species are also typically employed in the synthesis of the polyurea and polyurethane oligomers, the diisocyanates described in the patents typically comprising at least 6 carbon atoms separating the two diisocyanate groups. Thus these oligomers are generally built up or formed by a reaction of the diisocyanates with dihydric or diamino polyethers or polyesters, the latter comprising alkylene groups of from 1–16 carbon atoms and molecular weights in the range of 500–4000. Examples of particularly preferred polyethers for this purpose are polyoxyalkylene glycols having molecular weights in the range of about 1000–3000.

The low glass transition monomers preferably included in the coating compositions of EP 0204160 to render them liquid at room temperature are acrylate monomers which can be cured by exposure to ultraviolet light. Examples of such compounds are ethoxyethyl ethoxyethyl acrylate, phenoxyethyl acrylate, butoxyethyl acrylate and the like, with ethoxyethyl acrylate being preferred. These acrylate monomers liquefy the coating compositions without unduly reducing the softness of the cured resins at low temperatures.

As is-well known, these polyurethane, polyurea, or polyurethane/polyurea acrylate coating formulations generally also comprise conventional photoinitiators, such as the known ketonic photoinitiating additives, these being present in amounts sufficient to provide rapid ultraviolet curing.

As previously noted, hindered phenol derivatives and hindered piperidine derivatives have been employed as antioxidants for butadiene-based UV-cure resins, and a variety of these derivatives are known. Hindered phenol derivatives have been described by Chen et al. and suitable derivatives of this type for use in the invention may include, for example, octadecyl 3,5-di-tert-butyl-4-hydroxyhydrocinnamate, tetrakis(methylene(3,5-di-tert-butyl-4-hydroxyhydrocinnamate))4, and thiodiethylene (3,5-di-tert-butyl-4-hydroxyhydrocinnamate).

Hindered piperidine derivatives, also sometimes referred to as hindered amine light stabilizers, are also known, some of these materials being described by Chen et al., supra. One family of compounds which may suitably be employed in combination with the above described hindered phenol derivatives in accordance with the invention includes the bis(2,2,6,6-tetramethyl-4-piperidyl) sebacates, a specific example of this family being bis(2,2,6,6-tetramethyl-4-piperidyl) decanedioate.

Concentrations of these derivatives which are effective to usefully increase the induction time or time to rapid degradation of urethane-acrylate coatings in accordance with the invention will depend on the exact acrylate formulation selected for use. However, in the preferred formulations, concentrations of phenol derivatives in the range of about 0.2–1.0% in combination with piperidine derivative concentrations of about 0.2–1.0% will normally be preferred. Most preferably, the combination of stabilizers will be added to the coating formulation in proportion providing a total derivative concentration of at least about 0.5% by weight. Lesser concentrations of these additives are found to be insufficient to produce a useful stabilizing effect in these acrylate resin compositions, while greater concentrations risk undue increases in cure time and/or increasing degrees of instability in the uncured resin systems.

The invention may be further understood by reference to the following example.

EXAMPLE 1

A liquid coating composition suitable for apply as a UV-curable protective coating to a glass optical fiber is provided using a base resin consisting of a polyurethane diacrylate oligomer. This resin is a polyethylene glycol-based diacrylate having a molecular weight of about 508, and is commercially available as Sartomer 344resin from the Sartomer Company of West Chester, Pa., USA.

The liquid coating composition is prepared by combining 70 parts by weight of the diacrylate oligomer with 22 parts by weight of a liquid diacrylate effective to reduce the viscosity or the composition, 5 parts by weight of a reactive diluent, and 3 parts by weight of a photoinitiator. The liquid diacrylate included for viscosity control is a tripropylene glycol diacrylate having a molecular weight of about 300 and being commercially obtainable as Sartomer 306 resin from the Sartomer Company. The reactive diluent is a triacrylate monomer identified as glyceryl propoxy Lriacrylate and being commercially obtainable as Sartomer 9020 monomer from the Sartomer Company. The photoinitiaor is a ketonic photoinitiator identified as 2-methyl-l-(4-(methylthio)phenyl)-2-(4-morpholinyl)-1-propanone, this compound being commercially obtainable as Irgacure 907 photoinitiator from the Ciba-Geigy Corporation of Hawthorne, N.Y., USA.

The foregoing components are combined with thorough mixing to provide a liquid optical fiber coating composition, and then the liquid composition is divided into two portions and one of the two portions is chemically stabilized against thermal decomposition. This stabilization is achieved by the addition to the composition of a combination of a hindered phenol derivative and a hindered piperidine derivative.

The hindered phenol derivative employed is thiodiethylene bis(3,5-di-tert-butyl-4-hydroxyhydrocinnamate),commercially available as Irganox 1035 antioxidant from the Ciba-Geigy ,Corporation. The hindered piperidine derivative employed is a bis(2,2,6,6-tetramethyl-4-piperidyl) sebacate, this derivative being commercially obtainable as TinUVin 292 hindered amine light stabilizer from the Ciba-Geigy Corporation. The additions are in proportions providing weight concentrations of 0.5% of the phenol derivative and 0.5% of the piperidine derivative in the stabilized composition.

Each of the stabilized and unstabilized compositions thus prepared is applied as a thin coating to a number of glass test substrates, and the coatings are cured by exposure to 3.5 J/cm$^2$ of ultraviolet radiation from a Fusion Systems D bulb. No significant difference in curing speed between the two compositions is noted, and the cured coatings are flexible yet sufficiently tough to provide an effective protective layer on the glass surface.

Figure 4:
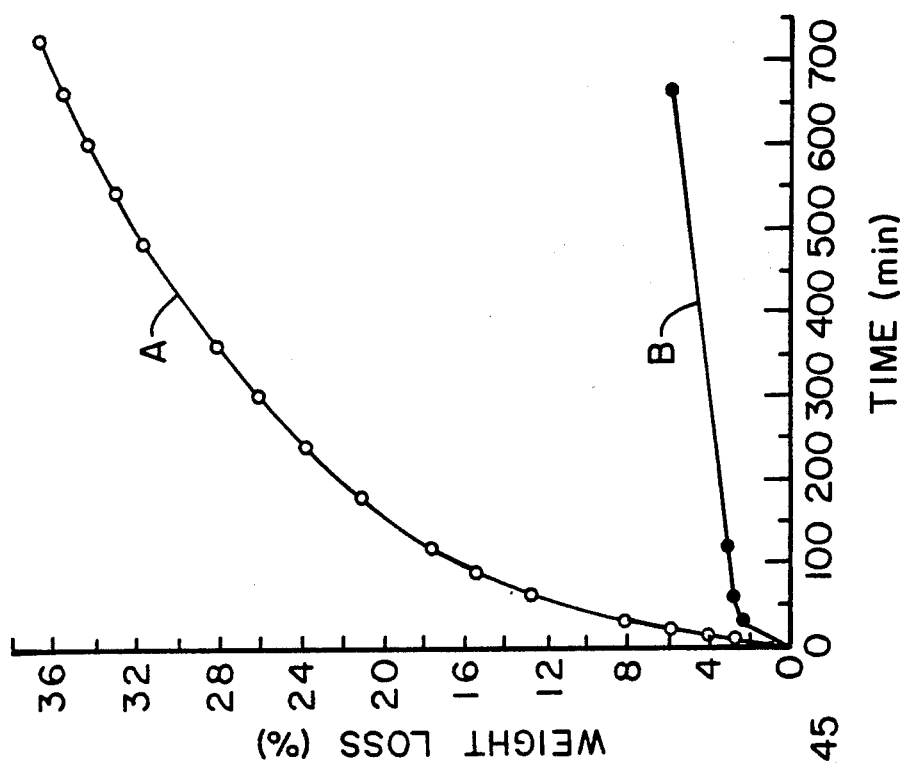
FIG. 4 is a graph plotting weight loss at an elevated temperature (190° C.) for a cured polyurethane acrylate coating resin before and after stabilization in accordance with the invention.

Samples of the cured coatings thus provided are next subjected to isothermal heating at 190° C. in air to determine stability against thermal decomposition. Results of this test are illustrated in FIG. 4 of the drawing, wherein curve A plots weight loss as a function of temperature for the composition free of the stabilizer combination, and curve B plots weight loss at the same temperature for the stabilized composition.

As is evident from these curves, the unstabilized composition (curve A) exhibits rapid and continuous weight loss over the entire testing interval at this temperature. In contrast, the stabilized composition (curve B) exhibits significantly higher stability as indicated by the prolonged period of gradual weight loss (induction time following the initial small loss of volatile components. The induction time for the stabilized composition or this Example is approximately 650 minutes at 190° C., or approximately equal to the induction time of the stabilized composition of FIGS. 1-3 at 160° C. Thus a substantial improvement in thermal stability without an objectionable attendant increase in curing time is achieved.

Of course the foregoing example is merely illustrative of stabilized formulations and methods for their stabilization which may be carried out within the scope of the present invention, and numerous variations and modifications of these specific procedures and composition may be resorted to within the limitations of the appended claims.

I claim:

1. A method for thermally stabilizing a UV-cured acrylate-terminated resin selected from the group consisting of polyurethane acrylate, polyurea acrylate, and polyurethane/polyurea acrylate resins which comprises the step of:

adding to the composition for the resin, in a concentration at least effective to reduce the thermal decomposition rate of the cured resin, a combination of stabilizers which consists essentially of a hindered piperidine derivative and a hindered phenol derivative.

2. A method in accordance with claim 1 wherein the hindered phenol derivative is added in a proportion providing a concentration of about 0.2-1.0% by weight of the derivative in the composition.

3. A method in accordance with claim 1 wherein the hindered piperidine derivative is added in a proportion providing a concentration of about 0.2-1.0% by weight of the derivative in the composition.

4. A method in accordance with claim 1 wherein the combination of stabilizers is added in a proportion providing a concentration of at least about 0.5% by weight of the combination in the composition.

5. A method in accordance with claim 4 wherein the hindered phenol derivative is a compound selected from the group consisting of octadecyl 3,5-di-tert-butyl-4hydroxyhydrocinnamate, tetrakis(methylene(3,5-di-tert-butyl-4-hydroxyhydrocinnamate)), and thiodiethylene bis(3,5-di- tert-butyl-4-hydroxyhydrocinnamate).

6. A method in accordance with claim 4 wherein the hindered piperidine derivative is a hindered amine light stabilizer.

7. A method in accordance with claim 4 wherein the hindered piperidine derivative is a compound selected from the group consisting of bis(2,2,6,6-tetramethyl-4piperidyl) sebacates.

8. A method in accordance with claim 7 wherein the hindered piperidine derivative is bis(2,2,6,6-tetramethyl-4-piperidyl) decanedioate.

9. In a composition for a liquid UV-curable acrylate resin which comprises as the principal component at least one acrylate-terminated oligomer selected from the group consisting of polyurethane, polyurea, or polyurethane/polyurea oligomers, the improvement wherein:

the resin further comprises a stabilizing additive consisting essentially of a combination of a hindered piperidine derivative and a hindered phenol derivative, the said combination being present in a concentration at least effective to reduce the thermal decomposition rate of the composition.

10. A composition in accordance with claim 9 wherein the resin further comprises a liquid acrylate-functional component in admixture with the oligomer component which is effective to reduce the viscosity of the resin.

11. A composition in accordance with claim 10 wherein the acrylate-functional liquid component is selected from the group consisting of monoacrylate monomers and linear aliphatic diacrylates.

12. A composition in accordance with claim 11 wherein the acrylate-functional liquid component is a linear aliphatic diacrylate selected from the group consisting of polyalkylene glycol diacrylates.

13. A composition in accordance with claim 10 wherein the resin further comprises a reactive acrylate-functional diluent.

14. A composition in accordance with claim 13 wherein the reactive acrylate-functional diluent is a polyacrylate monomer.

15. A composition in accordance with claim 10 wherein the oligomer comprises 4–10 urethane groups per molecule and has a molecular weight in the range of about 500–8000.

16. A composition in accordance with claim 15 wherein the urethane groups are partially replaced by urea groups.

17. A composition in accordance with claim 16 wherein the oligomer comprises 2–6 urea groups per molecule.

* * * * *